United States Patent [19]

Karl

[11] Patent Number: 5,509,176
[45] Date of Patent: Apr. 23, 1996

[54] TORQUE HINGE

[75] Inventor: Rex A. Karl, Temple, Tex.

[73] Assignee: Texas Instruments Incorporated, Dallas, Tex.

[21] Appl. No.: 241,939

[22] Filed: May 12, 1994

Related U.S. Application Data

[63] Continuation of Ser. No. 20,915, Feb. 22, 1993, abandoned.

[51] Int. Cl.[6] .................................................. E05D 11/08
[52] U.S. Cl. ............................................................. 16/342
[58] Field of Search ...................... 16/228, 342, DIG. 33, 16/337–340; 439/31; 361/681

[56] References Cited

U.S. PATENT DOCUMENTS

| | | | |
|---|---|---|---|
| 2,774,098 | 12/1956 | Tieri | 16/228 |
| 2,828,668 | 4/1958 | De Angelis | 16/228 |
| 2,939,168 | 6/1960 | Ferron | 16/228 |
| 3,042,961 | 7/1962 | Tieri | 16/228 |
| 3,488,667 | 1/1970 | Gutshall | 16/341 |
| 3,837,042 | 9/1974 | White | 16/385 |
| 3,921,225 | 11/1975 | Suska | 16/273 |
| 4,256,388 | 3/1981 | Beyer | 16/228 |
| 4,428,094 | 1/1984 | Emain | 16/342 |
| 4,638,544 | 1/1987 | McNeil | 29/434 |
| 4,639,147 | 1/1987 | Schwarz | 16/342 |
| 4,930,184 | 6/1990 | Kristmanson | 16/342 |
| 4,964,193 | 10/1990 | Rommelfaenger et al. | 16/342 |
| 5,008,976 | 4/1991 | Busch | 361/681 |
| 5,018,244 | 5/1991 | Hino | 16/337 |
| 5,103,533 | 4/1992 | Pettit et al. | 16/342 |
| 5,109,572 | 5/1992 | Park | 16/341 |
| 5,173,837 | 12/1992 | Blackwell et al. | 16/342 |
| 5,178,481 | 1/1993 | Kawamura | 361/681 |
| 5,333,356 | 8/1994 | Katagiri | 16/340 |

FOREIGN PATENT DOCUMENTS

| | | | |
|---|---|---|---|
| 43-12373 | 5/1968 | Japan | 16/277 |
| 1404765 | 9/1975 | United Kingdom | 16/340 |

OTHER PUBLICATIONS

Facsimile sheet of A Product Data Sheet: *Endur©–C Microcellular Urethane Offers Design Latitude in Molded Urethane Components,* 1987, Rogers Corporation, Printed in U.S.A. 0387–097–1.OB, p. 1.

*Primary Examiner*—Lowell A. Larson
*Assistant Examiner*—Donald M. Gurley
*Attorney, Agent, or Firm*—Thomas G. Eschweiler; James C. Kesterson; Richard L. Donaldson

[57] ABSTRACT

A torque hinge 20 includes a shaft 14 surrounded with a coating 22 fixed to the shaft 14. The coated shaft 18 fits within a housing cavity 26 such that the coated shaft 18 is in frictional contact with the housing cavity 26. The frictional contact provides sufficient torque to torque hinge 20 to provide constant resistance through the torque hinge's entire range of motion.

20 Claims, 3 Drawing Sheets

TORQUE HINGE

This application is a continuation of application Ser. No. 08/020,915, filed Feb. 22, 1993, now abandoned.

FIELD OF THE INVENTION

This invention relates to hinges and more particularly to torque hinges.

BACKGROUND OF THE INVENTION

The use of hinges for the opening and closing of various apparatus is notoriously well known. Torque hinges are a subset of hinges that allow an apparatus to have resistance throughout the apparatus' entire range of motion.

In electronic markets, torque hinges have been utilized in a number of areas. One example is the notebook computer. Torque hinges are desirable because a user wishes to open the computer and use the top lid portion as a computer display. Because users all differ in height and in location during use of the computer, it is desirable to be able to open the lid of the computer and hold the lid of the computer at various angles to maximize a users' visibility, avoid a glare, etc. A torque hinge provides constant resistance throughout the computer lid's range of motion and is therefore ideal for this application.

A conventional, prior art spring torque hinge 10 is illustrated in FIG. 1. A spring 12 is wound around a shaft 14. Spring 12 has two ends 12a and 12b that are connected to a clasp 16 that holds the compression of spring 12 fixed. Spring torque hinge 10 has what is referred to as an interference fit. An interference fit comprises two articles; one designed to fit within the other. The article that is to fit within the other is designed to be slightly larger than the opening of the other article. For example, with spring torque hinge 10 the inside diameter of spring 12 is slightly smaller than the outside diameter of shaft 14 such that when spring 12 is wrapped around shaft 14 the "interference" between spring 12 and shaft 14 causes the necessary friction for continuous resistance through shaft's 14 range of movement.

Spring torque hinge 10 suffers from a serious problem. Over time, spring 12 loses its original "tightness", or uniformity, and begins to assume the diameter of shaft 14. This is undesirable since this results in decreased friction between spring 12 and shaft 14. Therefore, the desired resistance, or torque, is not maintained over time. Testing of a standard torque hinge (10,000 actuations) resulted in spring torque hinge 10 losing more than 50% of its initial torque.

It is an object of this invention to provide a new hinge that provides improved wear over time, improved frictional characteristics, increased life, and decreased cost. Other objects and advantages of the invention will be apparent to those of ordinary skill in the art having reference to the following specification and drawings.

SUMMARY OF THE INVENTION

An interference fit torque hinge includes a shaft surrounded with a coating. The coated shaft fits within a housing cavity such that the coated shaft is in frictional contact with the housing cavity. The frictional contact provides sufficient torque to the torque hinge to provide constant resistance through the torque hinge's entire range of motion and improved reliability by maintaining its torque throughout a product's lifetime.

DETAILED DESCRIPTION OF THE PREFERRED EMBODIMENT

Figure 2:
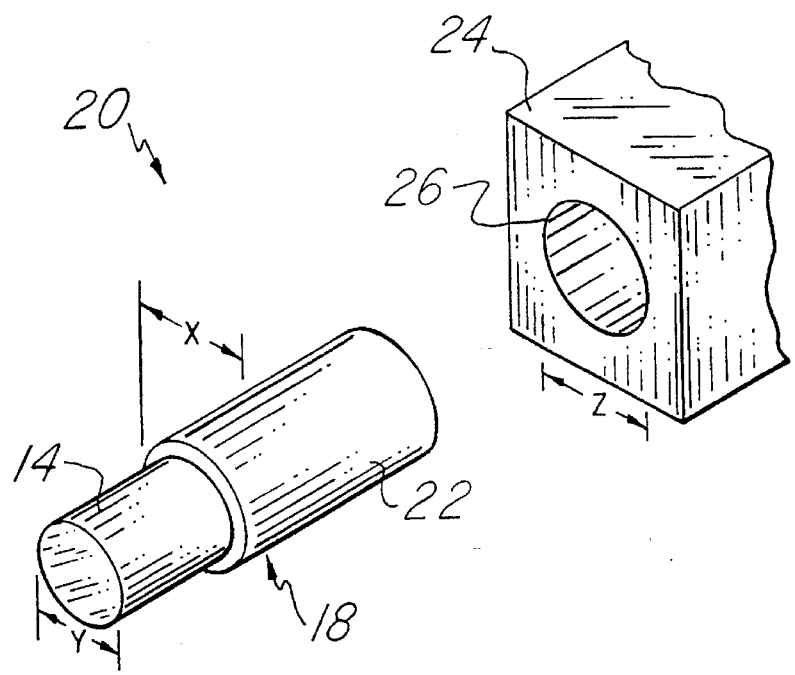
FIG. 2 is the preferred embodiment of the invention, a foam type, interference fit torque hinge.

FIG. 2 illustrates the preferred embodiment of the invention, namely a foam type, interference fit torque hinge 20. Shaft 14 is surrounded by a coating 22. Coating 22 is applied to shaft 14 using any appropriate process. Coating 22 is fixed to shaft 14 such that coating 22 moves radially with shaft 14 as shaft 14 is manipulated. Shaft 14 and foam 22 fit into a cavity 26 within a housing 24. Hinge 20 is designed such that outside diameter "Y" of shaft 14 is smaller than the inside diameter "Z" of cavity 26. Also, the outside diameter of coating 22 "X" in FIG. 2 is designed to be larger than the inside diameter "Z" of cavity 26. It is obvious that since "X" is larger than "Z" that coating 22 must be compressive in order to fit within cavity 26 of housing 24. The compressive force of coating 22 against cavity 26 coupled with the coefficient of friction between coating 22 and housing 24 defines the torque provided by hinge 20.

Figure 1:
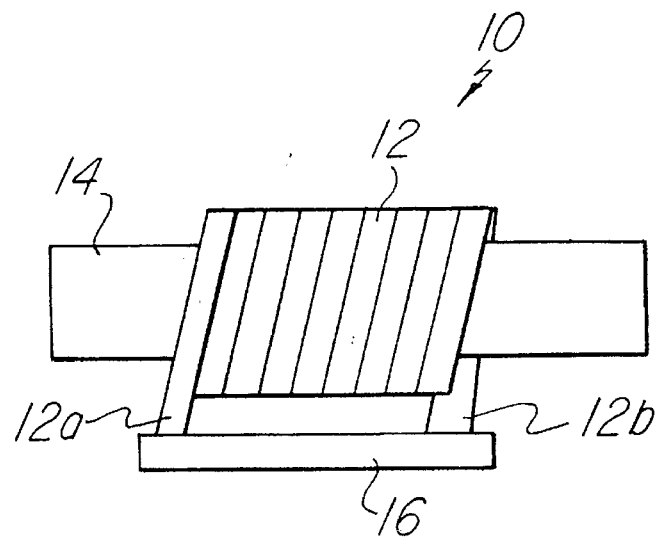
FIG. 1 is a prior art drawing illustrating a spring torque hinge.

Hinge 20 of FIG. 2 showed substantial improvement over prior art interference fit torque hinges such as hinge 10 of FIG. 1. One variable that is measured is the resistance to compression set which is defined as the ability to maintain its original torque over time. Therefore, a high quality torque hinge will maintain a high percentage of its original torque throughout its lifetime. Hinge 20 was tested by performing 30,000 actuations and measuring the torque at varying intervals. Results showed that after 30,000 actuations (considered a product lifetime) hinge 20 maintained 92% of its original torque while prior art hinge 10 of FIG. 1 had lost torque consistency; the maximum torque being less than 50% of its original torque after only 10,000 actuations.

Coating 22 of hinge 20 may be preferably composed of microcellular urethane (MCU) foam. MCU foam provides high endurance properties as shown in the above testing thereby exuding excellent wear characteristics. MCU also provides dimensional stability as shown in the ENDUR®-C Microcellular Urethane Products Data Sheet printed in 1987 by Rogers Corporation which is hereby incorporated by reference. MCU also exhibits good chemical, heat, and ozone resistance while concurrently being lower cost than conventional torque hinge 10. Specifically, the current cost for a prior art spring type interference fit torque hinge is approximately $4.50. Using two hinges per product, the total cost for the hinges is $9.00 per product. The new hinge 20 of FIG. 2 costs approximately $2.00. Therefore, the total cost for the hinges per product is only $4.00 which represents a savings of $5.00 per product or a cost savings of 55%.

Other types of foams may be used in replacement of MCU foam. Furthermore, coating 22 does not have to be a foam. Coating 22 may consist of teflon or silicone or any compressive substance that would provide suitable friction between coating 22 and housing 24. To vary the torque one may increase or decrease the length of shaft 14 and coating 22 making contact within cavity 26 of housing 24 or by increasing or decreasing the thickness of coating 22 or varying the inside diameter of cavity 26 thereby increasing the compressive force in hinge 20. Further, the material density of coating 22 may also be varied.

Figure 3:
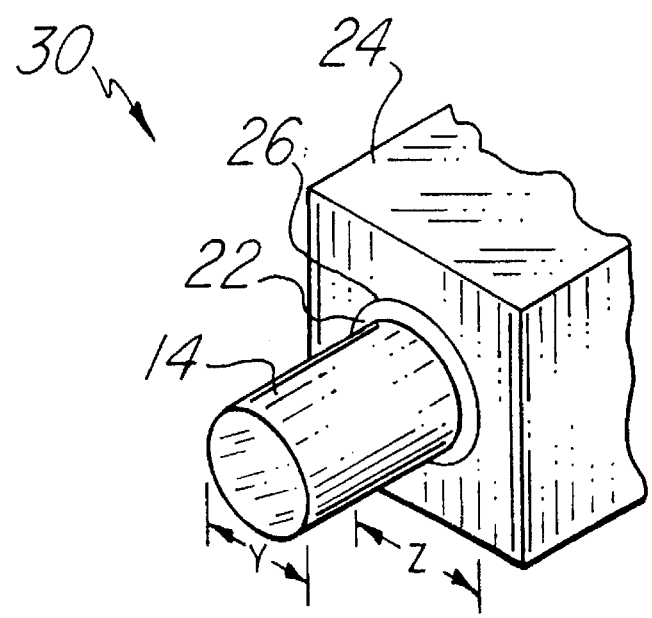
FIG. 3 is an alternative embodiment of the invention.

An alternative embodiment of the invention is illustrated in FIG. 3. In FIG. 3, a hinge 30 consists of a coating 22 fixed inside cavity 26 of housing 24. Therefore the outside diameter of coating 22 will be equal to the diameter of "Z" of cavity 26. The inside diameter "X" of coating 22 is not shown because FIG. 3 illustrates coating 22 compressed. Shaft 14 has a diameter "Y" that is larger than the inside diameter "X" of coating 22. This physical relationship causes coating 22 to compress and create frictional contact with shaft 14 when shaft 14 is inserted inside coating 22. The compressive force between shaft 14 coupled with the coefficient of friction between shaft 14 and coating 22 forms the torque of hinge 30. Coating 22 would preferably consist of microcellular urethane foam (MCU) but may consist of other types of foam or other compressive materials such as silicone or teflon. Increasing or decreasing the desired torque may be obtained by increasing or decreasing the contact length between coating 22 and shaft 14 in housing 24, varying the material density of coating 22, or varying the thickness of coating 22.

Figure 4:
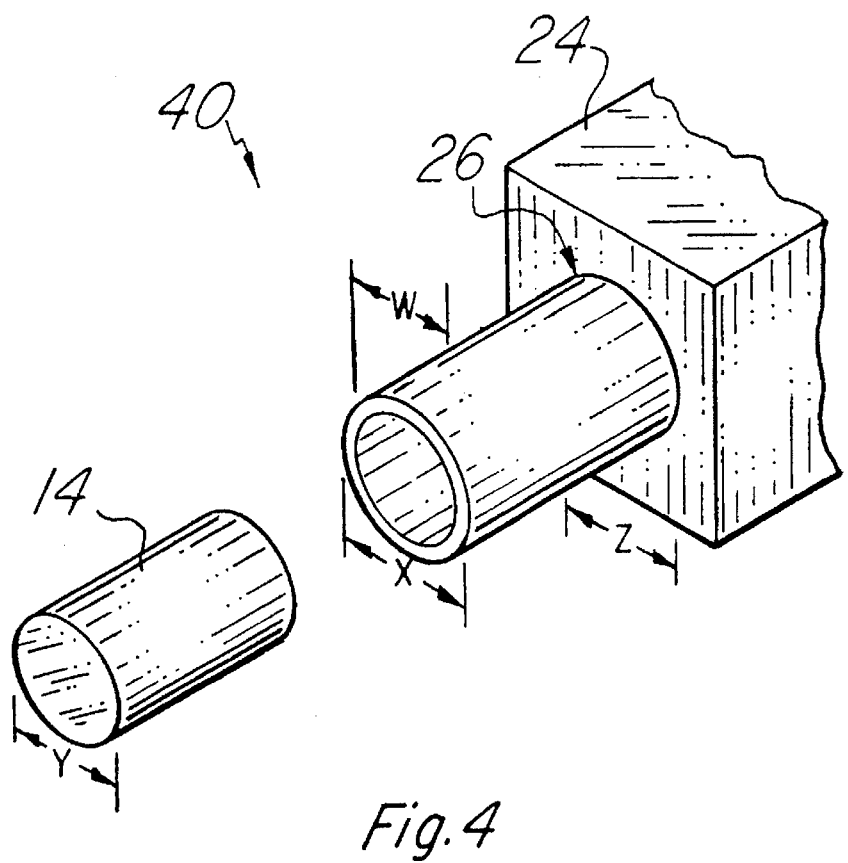
FIG. 4 is another alternative embodiment of invention.
Figure 5:
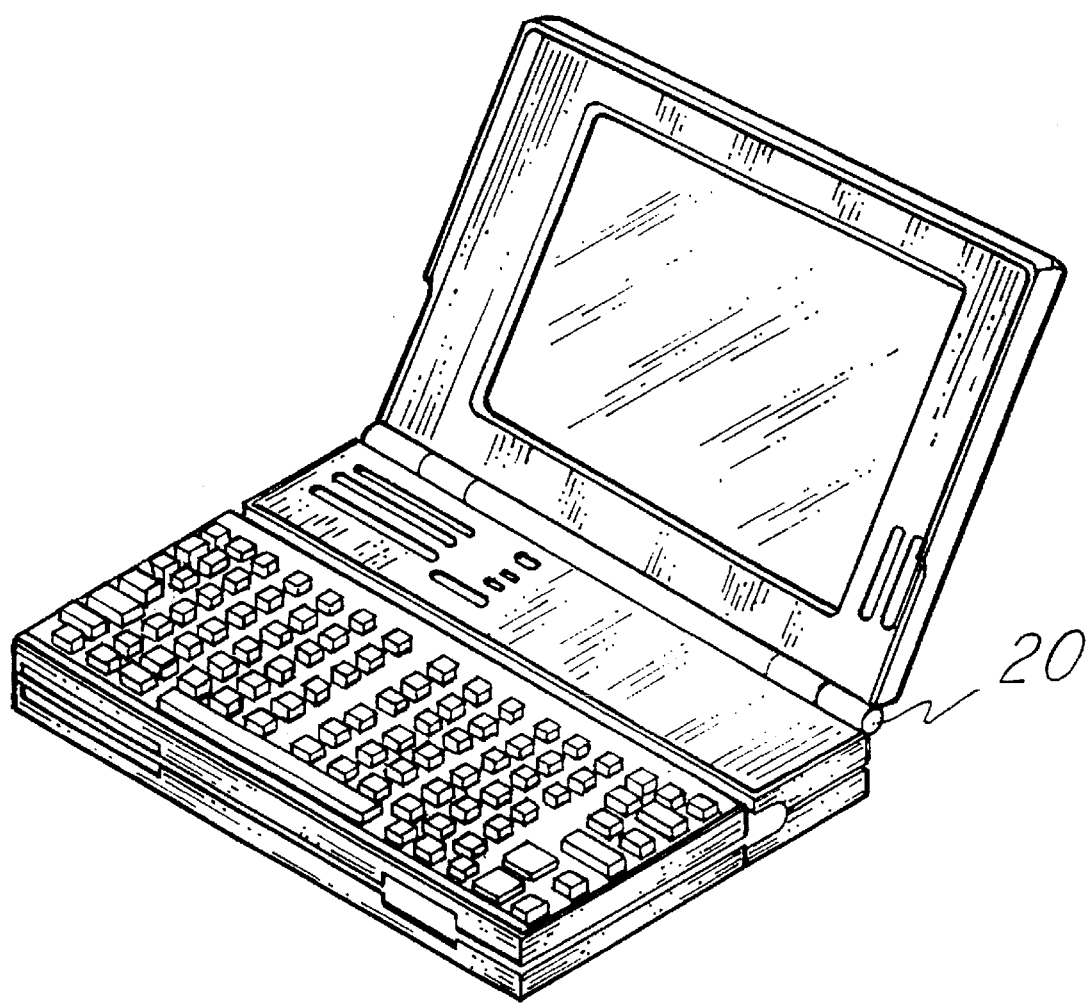
FIG. 5 is a diagram illustrating a computer incorporating the preferred embodiment of the invention.

FIG. 4 is another alternative embodiment of the invention. In FIG. 4, a hinge 40 includes coating 22 not fixed to either cavity 26 of housing 24 or shaft 14. In this embodiment the outside diameter "X" of coating 22 is larger than the diameter "Z" of cavity 26. Therefore, there is a compressive force between coating 22 and housing 24 and therefore frictional contact. The inside diameter W of coating 22 is designed to be smaller than the diameter "Y" of shaft 14. Therefore, when shaft 14 is inserted into coating 22, coating 22 is further compressed and shaft 14 will be in frictional contact with the inside surface of coating 22. Therefore, hinge 40 has a torque provided by two components: one, the compressive force between shaft 14 and coating 22 coupled with the coefficient of friction between the two respective materials and two, the compressive force between coating 22 and housing 24 coupled with the coefficient of friction between the two respective materials. This provides more design flexibility since the compressive forces can be manipulated by adjusting the diameters of the shaft, coating, or housing and the coefficient of friction can be manipulated by varying the materials used for shaft 14, coating 22, and housing 24. The coefficient of friction may also be adjusted by varying the material densities of shaft 14, coating 22, and housing 24. In hinge 40, coating 22 preferably consists of MCU foam. Other types of foam may be substituted for MCU foam. Further, other types of compressive materials other than foams may be used for coating 22.

It should also be noted that although FIGS. 2, 3, and 4 illustrate torque hinges with cylindrical shafts 14, coatings 22, and cavities 26 that the invention is not limited to this configuration. For ease of design or manufacturability it may be useful to have a cylindrical cavity 26 with an octagonal shaft 14 and coating 22. All shape variations of cavity 26, coating 22, and shaft 14 would fall within the spirit of this invention.

Although the invention has been described with reference to a preferred embodiment and alternative embodiments herein, this description is not to be construed in a limiting sense. Various modifications of the disclosed embodiments will become apparent to persons skilled in the art upon reference to the description of the invention. It is therefore contemplated that the appended claims will cover any such modifications or embodiments as fall within the true scope of the invention.

What is claimed is:

1. A computer system having a torque hinge, comprising:
    a computer housing having a cavity, the cavity having a transverse cross-sectional area;
    a shaft positioned in the cavity, the shaft having a transverse cross-sectional area smaller than that of the cavity; and
    an annular, resiliently compressible coating covering the shaft, wherein the outer diameter of the annular coating covering the shaft has a larger transverse cross-sectional area than the transverse cross-sectional area of the cavity thereby creating an interference frictional fit between the shaft, coating and cavity and causing sufficient friction to provide resistance throughout the hinge's entire range of motion.

2. The computer system having a torque hinge of claim 1 wherein the cavity is cylindrical.

3. The computer system having a torque hinge of claim 1 wherein the shaft is cylindrical.

4. A computer system having a torque hinge, comprising:
    a computer housing having a cavity;
    an annular coating formed in the cavity, the annular coating being resiliently compressible, and having an opening, the opening having a transverse cross-sectional area; and
    a shaft positioned in the opening, wherein the shaft has a larger transverse cross-sectional area than the transverse cross-sectional area of the opening, thereby causing the coating to compress and create an interference frictional fit between the shaft, coating and cavity, causing sufficient friction to provide resistance throughout the hinge's entire range of motion.

5. The computer system having a torque hinge of claim 4 wherein the cavity is cylindrical.

6. The computer system having a torque hinge of claim 4 wherein the shaft is cylindrical.

7. The computer system having a torque hinge of claim 5 wherein the coating comprises microcellular urethane foam.

8. A computer system having a torque hinge, comprising:
    a computer housing having a cavity; the cavity having a transverse cross-sectional area; and
    an annular microcellular urethane foam coating within the cavity and having an outside transverse cross-sectional area smaller than the transverse cross-sectional area of the cavity, the annular coating being resiliently compressible and having an opening; and
    a shaft positioned in the opening, wherein the shaft has a larger transverse cross-sectional area than the transverse cross-sectional area of the opening thereby causing the coating to compress and create an interference frictional fit between the cavity, coating and shaft, thereby causing sufficient friction resistance throughout the hinge's entire range of motion.

9. The computer system having a torque hinge of claim 8 wherein the cavity is cylindrical.

10. The computer system having a torque hinge of claim 8 wherein the shaft is cylindrical.

11. A computer system having a torque hinge, comprising:
    a computer housing having a cavity, the cavity having a transverse cross-sectional area;
    an annular resiliently compressible coating positioned within the cavity and having an opening, the opening having a transverse cross-sectional area; and a cross-sectional part having a larger transverse cross-sectional area than that of the opening and is positioned within the opening such that the coating is compressed and an interference frictional fit between the cavity, coating and cross-sectional part is achieved causing sufficient friction to provide resistance throughout the hinge's entire range of motion.

12. The computer system having a torque hinge of claim 11 wherein the cross-sectional cavity is an N-sided polygon wherein N is greater than two.

13. The computer system having a torque hinge of claim 11 wherein the resiliently compressible coating comprises a microcellular urethane foam.

14. A computer, comprising:

a computer housing having a first portion and a second portion, wherein the first portion has a cross-sectional cavity and the second portion has a protruding fitting that extends into the cross-sectional cavity, wherein the cross-sectional cavity has a larger transverse cross-sectional area than the protruding firing, thereby creating a clearance between the cross-sectional cavity and the protruding fitting; and a resiliently compressible coating positioned between the cross-sectional cavity and the protruding fitting, wherein the coating is thicker than the clearance so as to be compressed between the cross-sectional cavity and the protruding fitting and an interference frictional fit between the cavity, coating and protruding fitting is achieved and a hinge formed, thereby causing sufficient friction to provide resistance throughout the hinge's entire range of motion.

15. The computer of claim 14 wherein the first portion of the computer housing comprises a base portion for the computer, wherein the base serves as a data input for the computer.

16. The computer of claim 14 wherein the second portion of the computer housing comprises a lid for the computer, wherein the lid serves as a visual monitor for the computer.

17. The computer of claim 14 wherein the protruding fitting comprises an N-sided polygon wherein N is greater than two.

18. The computer of claim 14 wherein the cross-sectional cavity comprises an N-sided polygon wherein N is greater than two.

19. The computer of claim 14 wherein the compressible coating comprises a microcellular urethane foam.

20. A computer system having a joint hinge, comprising:

a computer housing having a cavity, the cavity having a transverse cross-sectional area;

an appendage having a transverse cross-sectional area smaller than the cross-sectional area of the cavity and positioned within the cavity, thereby creating a clearance between the cavity and appendage; and a resiliently compressible coating within the cavity between the housing and the appendage, wherein the coating is thicker than the clearance so as to be compressed and an interference frictional fit between the cavity, coating and appendage is achieved providing sufficient friction to provide resistance throughout the entire range of motion.

\* \* \* \* \*